United States Patent [19]

Miyashita et al.

[11] Patent Number: 4,554,774

[45] Date of Patent: Nov. 26, 1985

[54] SYSTEM FOR SYNCHRONIZING TWO OR MORE PROCESS UNITS

[75] Inventors: Yoshikazu Miyashita; Shiaru Muranaka; Hideo Tanaka, all of Kanazawa, Japan

[73] Assignee: Shibuya Kogyo Co., Ltd., Ishikawa, Japan

[21] Appl. No.: 603,538

[22] Filed: Apr. 25, 1984

[30] Foreign Application Priority Data

Apr. 30, 1983 [JP]  Japan ................................. 58-76985
Apr. 30, 1983 [JP]  Japan ................................. 58-76986

[51] Int. Cl.⁴ ............................................. B65B 57/20
[52] U.S. Cl. .......................................... 53/52; 53/73; 53/282
[58] Field of Search ................... 53/52, 55, 64, 75, 76, 53/281, 282, 501; 198/575, 576

[56] References Cited

U.S. PATENT DOCUMENTS 4,381,637  5/1983  Ballestrazzi et al. ............... 53/64 X

FOREIGN PATENT DOCUMENTS 2074533  4/1981  United Kingdom .................... 53/52
2080976  7/1981  United Kingdom ................. 53/500

Primary Examiner—John Sipos
Assistant Examiner—Michael D. Folkerts
Attorney, Agent, or Firm—Alan H. MacPherson; Richard Franklin; Steven F. Caserza

[57] ABSTRACT

A system for synchronizing the operation between a filling unit for filling desired contents into bottles and a capping unit for capping the thus filled bottles in a bottle handling line is provided. The present synchronized driving system includes separate driving motors for separately driving the filling and capping units. The timing of operation of each of the filling and capping units is detected and its information is supplied to a micro-computer which then, after carrying out predetermined calculations, controls the operating conditions of the driving motors to keep the filling and capping units synchronized.

6 Claims, 3 Drawing Figures

SYSTEM FOR SYNCHRONIZING TWO OR MORE PROCESS UNITS

BACKGROUND OF THE INVENTION

1. Field of the Invention

This invention generally relates to a synchronizing system and particularly to a system for synchronizing two or more process units, such as filling and capping units arranged in a bottle handling line.

2. Description of the Prior Art

Various process units are arranged in a container handling line which handles containers, such as bottles. Typical process units include a filling unit for filling desired contents, such as beverage, into containers by a predetermined quantity and a capping unit disposed downstream of the filling unit for capping the containers thus filled with the desired contents. Since the containers are transported along a predetermined travelling path through the filling and capping units continuously, the filling and capping units must be operated synchronously. In accordance with the typical prior art structure, use was made of a common driving shaft thereby mechanically coupling the filling and capping units.

FIG. 1 shows part of the typical prior art container handling system, which includes a filling unit 1 for filling contents into containers, such as bottles, and a capping unit 2 for capping the containers after having been filled with the contents. As shown, the filling unit 1 includes a center column 1a which is fixedly mounted on a turntable 27 (see FIG. 2) and thus is driven to rotate in a predetermined direction. On top of the column 1a is fixedly mounted a filling head 1b along the periphery of which are provided a plurality of actuator cylinders 1c, each of which is provided with a projectable rod 1d having a filling nozzle 1e mounted at its bottom end. Also provided is a pair of timing screws 3a and 3b which are driven to rotate synchronously with the filling and capping units 1 and 2 as will be described more in detail later. As the timing screws 3a and 3b are driven to rotate in a predetermined direction, containers B such as bottles are transported as engaged with a spiral groove engraved therealong, as shown in FIG. 2. Thus, the containers B are transported as spaced from one another at a predetermined pitch.

As also shown in FIG. 2, an inlet star wheel 25 provided with a plurality of notches along its periphery is disposed at the downstream end of the timing screw 3a for receiving the containers B transported between the timing screw 3a and a guide plate 24 and having them transported to the turntable 27 as guided by a guide rail 26 and the star wheel 25. Although not shown specifically, as well known for one skilled in the art, the turntable 27 is typically provided with container holding units mounted along its periphery, and, thus, the containers B are temporarily securely held on the turntable 27 thereby being transported along the path indicated by the two-dotted line. While the containers B are securely held as described above, the filling nozzles 1e are moved downward to engage with the mouths of the containers B thereby having desired contents filled into the containers B by a predetermined amount.

Also provided is an outlet star wheel 28 between the turntable 27 and the timing screw 3b, as shown in FIG. 2. The outlet star wheel 28 is driven to rotate counterclockwise also synchronously so that the containers B now filled with the desired contents are transported along a guide rail 29 to be brought into engagement with the timing screw 3b which extends between the filling unit 1 and the capping unit 2. Also provided is a guide plate 30 which extends in parallel with the timing screw 3b thereby defining the travelling path for the containers B between the filling and capping units 1 and 2. At the downstream end of the timing screw 3b is disposed the capping unit 2 which includes a center column 2a, a capping head 2b fixedly mounted on top of the center column 2a, a plurality of vertically movable rods 2c arranged along the periphery of the head 2b and a like plurality of capping blocks 2d, each mounted at the bottom end of the corresponding rod 2c. Similarly with the filling unit 1, the capping unit 2 also includes a turntable (not shown), which is driven to rotate synchronously with the timing screw 3b. Thus, while the containers B filled with desired contents move along a predetermined circular path as riding on the turntable after having been transported from the timing screw, the capping blocks 2d are lowered to be brought into engagement with the mouths of the containers B to have them capped.

FIG. 1 also shows a driving system for driving the filling and capping units 1 and 2 and the timing screws 3a and 3b synchronously. As shown, there is provided a driving motor 22 whose driving force is transmitted to the filling unit 1 through a driving shaft 23a and further through driving shafts 23b and 23c to the timing screws 3a and 3b. On the other hand, the driving motor 22 also transmits its driving force to the capping unit 2 through power transmitting elements 23d, 23e, 23f and 23g. Such a synchronized driving system tends to be bulky and complicated in structure. Moreover, the driving motor 22 must be large in capacity, which tends to push up the cost. Further, since it is entirely mechanical structurally, it requires extensive care and maintenance and lacks adaptability to different operating conditions. Also shown in FIG. 1 are control panels 20 and 21 for controlling the operation of the filling and capping units 1 and 2, respectively.

SUMMARY OF THE INVENTION

It is therefore a primary object of the present invention to obviate the disadvantages of the prior art as described above and to provide an improved system for synchronizing two or more process units, such as filling and capping units in a bottle handling line.

Another object of the present invention is to provide a synchronized driving system for driving two or more process units, such as filling and capping units in a bottle handling line, capable of maintaining an intended synchronous relation between the units.

A further object of the present invention is to provide a synchronized driving system which requires no common driving shaft between the process units to be operated synchronously.

A still further object of the present invention is to provide a synchronized driving system whose synchronous condition may be varyingly set with ease.

A still further object of the present invention is to provide a synchronized driving system which is smaller in size and easy to manufacture.

Other objects, advantages and novel features of the present invention will become apparent from the following detailed description of the invention when considered in conjunction with the accompanying drawings.

DESCRIPTION OF THE PREFERRED EMBODIMENTS

Figure 1:
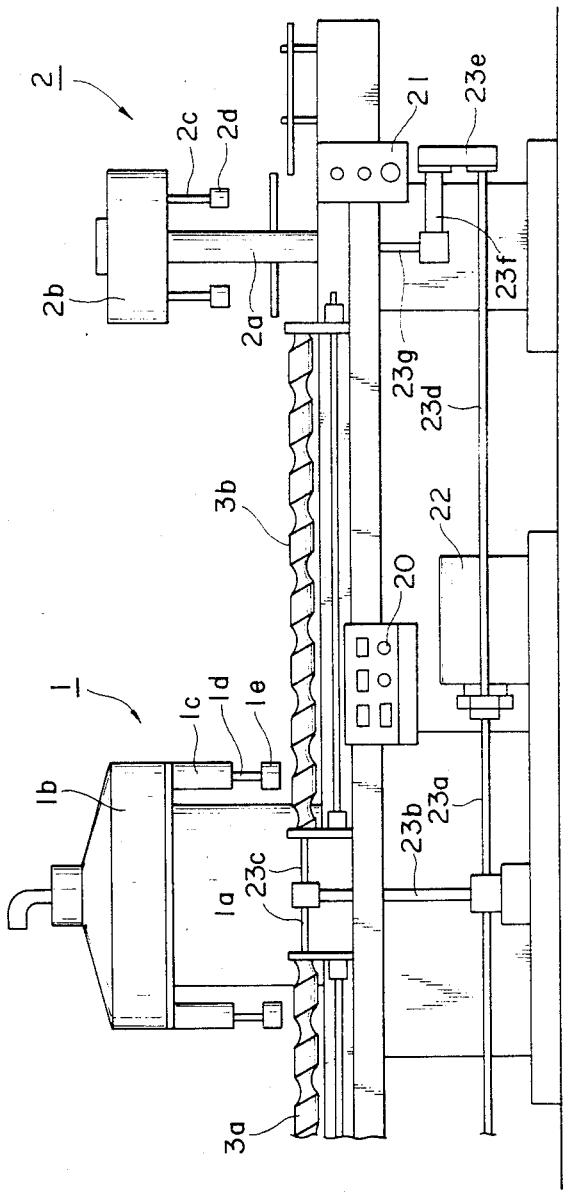
FIG. 1 is a schematic illustration showing part of a typical prior art bottle handling line, including filling and capping units 1 and 2.
Figure 2:
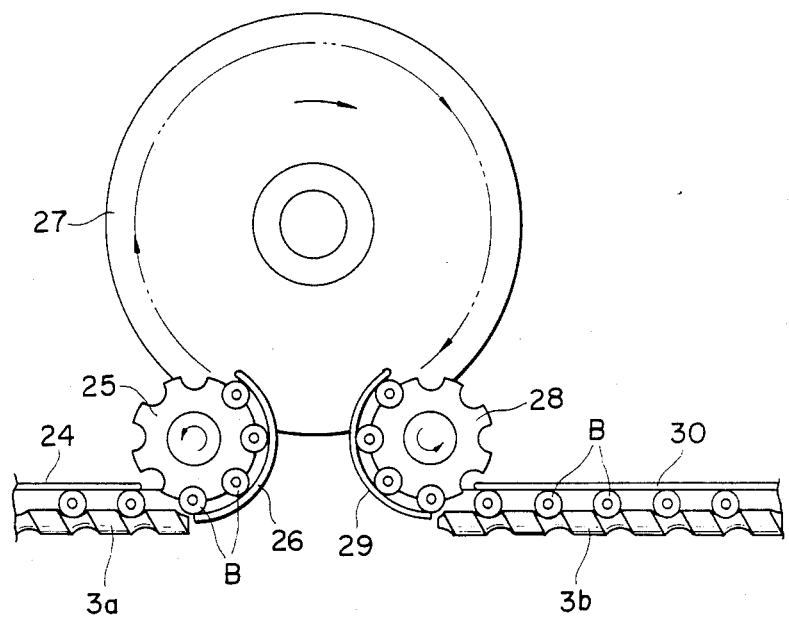
FIG. 2 is a schematic illustration showing the travelling path of the bottles B through the filling unit 1 as riding on the turntable 27.
Figure 3:
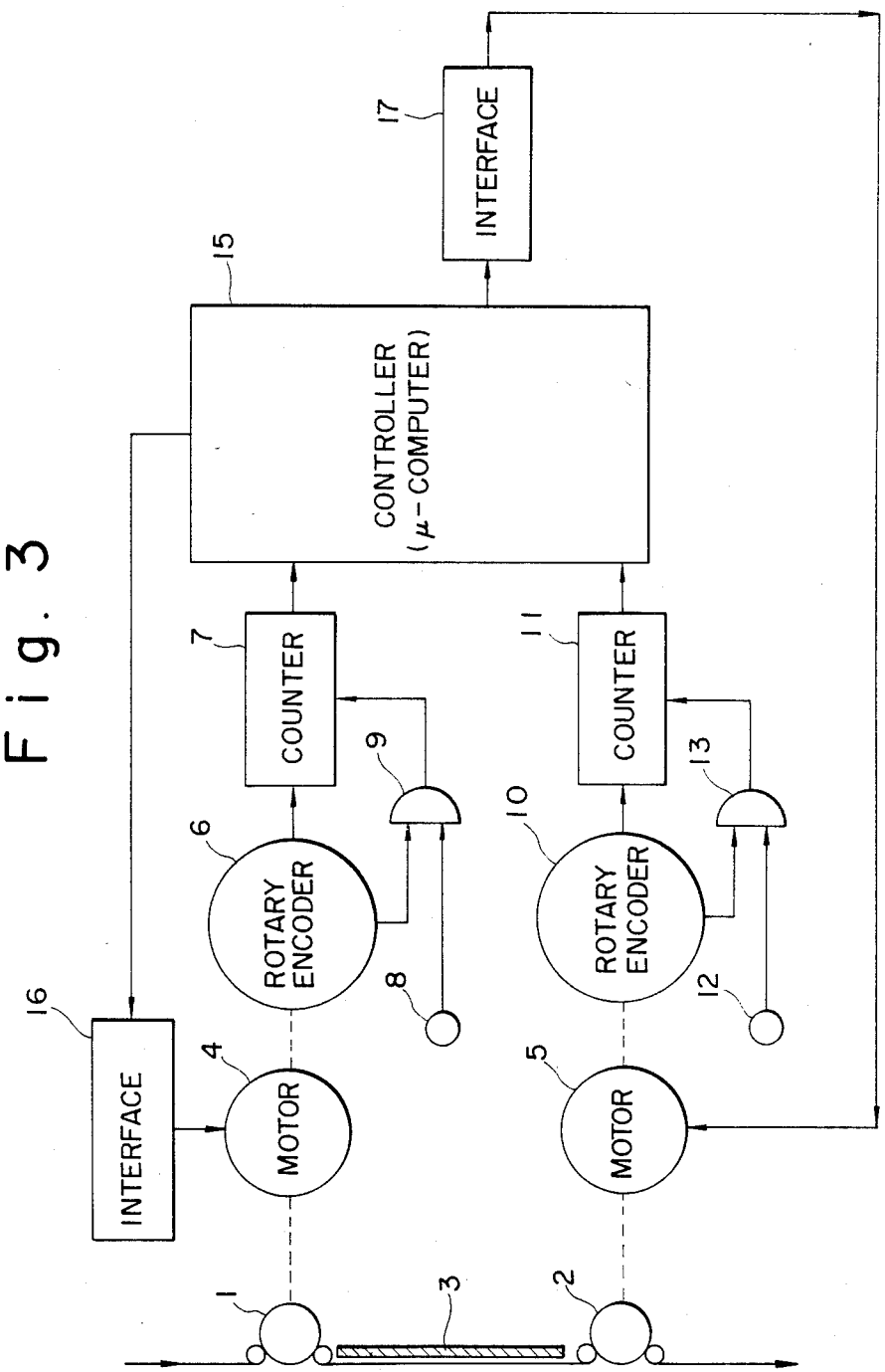
FIG. 3 is a diagram showing the overall structure of a synchronized driving system constructed in accordance with one embodiment of the present invention.

Referring now to FIG. 3, there is shown a synchronized driving system constructed in accordance with one embodiment of the present invention for use in synchronizing the operation between the filling unit 1 and the capping unit 2. In the illustrated case, since the containers or bottles to be processed are transported from the filling unit 1 to the capping unit 2 as indicated by the arrows, the filling unit 1 may be regarded as a main unit and the capping unit 2 as a follower unit as far as the operation of synchronization is concerned. A timing screw 3 is provided as interposed between the filling and capping units 1 and 2, and the timing screw 3 is driven to rotate as mechanically associated either with the filling unit 1 or with the capping unit 2. As already described with reference to FIGS. 1 and 2, empty containers such as bottles are fed into the filling unit 1 one after another at a predetermined pitch, where the empty containers are filled with desired contents, such as beverage, by a regulated amount. Then, the containers thus filled with the desired contents are transported toward the capping unit 2 under the guidance of the timing screw 3. The containers filled with contents but not capped are fed into the capping unit 2 one after another from the timing screw 3 where they are properly capped. Thereafter, the containers now filled with contents and capped are transported to a desired location.

In the illustrated example, since it is assumed that the timing screw is mechanically coupled to either one of the filling and capping units 1 and 2, there must be provided a system for synchronizing the operation between the filling and capping units 1 and 2. Such a synchronized driving system is shown in FIG. 3 and it includes a pair of first and second driving motors 4 and 5 for driving the filling and capping units 1 and 2, respectively. Thus, the filling and capping units 1 and 2 can be driven by separate driving sources independently from each other. The first driving motor 4 is provided with a first rotary encoder 6. The system includes a first counter 7 for counting the number of step pulses which are generated by the rotary encoder 6 as the motor 4 rotates. The rotary encoder 6 also supplies a zero point pulse every time the motor 4 completes one turn and this zero point pulse is supplied to one input of an AND gate 9 whose other input is connected from a first detector 8 for detecting the completion of a unit operation of the filling unit 1.

Here, the completion of "unit operation" indicates that the processing for a single container or bottle at the filling unit 1 has been completed. In other words, assuming that the filling unit 1 includes 20 filling nozzles as arranged circumferentially at an equal angular interval, the completion of unit operation is established when the turntable of the filling unit 1 has rotated over 1/20 of 360° thereby receiving a single empty container and discharging a single filled container to effectively completing the filling operation for a single container. Such a detection may be carried out, for example, by having the detector 8 located close to the filling unit 1 to detect the passing of each of the filling nozzles in front of the detector 8.

Thus, whenever the detector 8 detects the passing of a filling nozzle in front thereof and thus the completion of unit operation, it supplies a detection signal to one input of the AND gate 9. On the other hand, as the driving motor 4 completes one turn, the rotary encoder 6 generates a zero point pulse which is supplied to the other input of AND gate 9. It is to be noted that the AND gate 9 is structured to latch the zero point pulse upon receipt, and when the detection signal is supplied from the detector 8 to the AND gate 9 with the zero point pulse latched, the AND gate 9 supplies a reset signal to the counter 7 to have its count reset. In the illustrated example, it is so structured that two or more zero point pulses are generated between the two consecutive detection signals generated by the detector 8. In other words, while the turntable of the filling unit 1 rotates over 1/20 of 360°, the first driving motor 4 completes more than one turn.

The synchronizing system also includes a second rotary encoder 10 which is driven to rotate by the second driving motor 5, a second counter 11 for counting the number of step pulses generated by the rotary encoder 10, a detector 12 for detecting the completion of unit operation at the capping unit 2 and an AND gate 13 connected to receive signals from the rotary encoder 10 and the detector 12 to have the count of the counter 11 reset when a predetermined condition for the two inputs is met. This portion of the system, including elements 10-13, is similar to the above-described portion of the system, including elements 6-9, structurally as well as functionally.

The system also includes a controller 15 which is preferably comprised of a micro-computer or central processing unit and which is connected to receive count signals from the first and second counters 7 and 11. The controller 15 is also connected to supply a first control signal to a first interface circuit 16 which in turn is connected to the first driving motor 4 and to supply a second control signal to a second interface circuit 17 which in turn is connected to the second driving motor 5. A predetermined control program is stored in the controller 15 so that various calculations are carried out based on the information supplied from the first and second counters 7 and 11 and the resulting control signals necessary to maintain a desired synchronous relation between the filling and capping units 1 and 2 are supplied to the respective interface circuits 16 and 17 thereby suitably controlling the driving conditions of the motors 4 and 5. In this case, preferably, the operation of the capping unit 2, i.e., follower unit, is suitably controlled in association with the operating condition of the filling unit 1, i.e., main unit.

In operation, when a start-to-operate command is supplied to the controller 15, for example, from a main control unit (not shown) of the entire container handling line, the controller 15 sends a control signal to the interface circuit 16 to start the motor 4 to be driven to rotate thereby initiating the operation of the filling unit 1 and at the same time sends a control signal to the interface circuit 17 which thus causes the second motor 5 to rotate at a speed proportional to the rotational speed of the first motor 4, whereby a first mode of operation is established. Since the relative rotational angular relation and thus the synchronous relation in phase between the filling and capping units 1 and 2 is unknown at a time immediately after the initiation of operation, the controller 15 controls the first motor 4 to rotate at a predetermined low speed.

As soon as the operation is initiated, the counters 7 and 11 start to count the number of step pulses generated by the rotary encoders 6 and 10, respectively, and the AND gates 9 and 13 receive zero point pulses from the respective rotary encoders 6 and 10 and detection signals from the respective detectors 8 and 12 to reset the counts of counters 7 and 11 in a predetermined manner. The most simple example is that the filling and capping units 1 and 2 are synchronized when the first and second counters 7 and 11 are simultaneously reset. In this case, since the filling and capping units 1 and 2 are out of phase synchronization if the first and second counters 7 and 11 are not reset at the same time, the controller 15 supplies a control signal to the interface circuit 17 to control the rotational speed of the second motor 5 depending upon the amount of deviation from the intended synchronized relation.

Accordingly, when the first and second counters 7 and 11 are reset for the first time, the system enters into a second mode of operation. In the first mode of operation, only the rotational speeds of the first and second motors 4 and 5 are synchronized; however, in the second mode of operation, the system operates to bring the first and second motors 4 and 5 into a phase synchronized condition. Described more in detail with respect to this second mode of operation, since the controller 15 stores the maximum count values which were present in the respective counters 7 and 11 at the time immediately before having been reset and which correspond to the unit operation of the respective filling and capping units 1 and 2, the controller 15 calculates an expected count value for the second counter 11 of capping unit 2 from the current count value supplied from the first counter 7 associated with the filling unit 1 and compares the expected count value with the real count value supplied from the second counter 11. And, then, if there is a difference between the expected and real count values thus compared, then the controller 15 decides that the filling and capping units 1 and 2 are out of phase.

When such an out-of-phase condition is detected, the controller 15 then supplies a control signal to the second motor 5 to gradually increase or decrease its rotational speed on the basis of a ratio of a difference between the expected count value and the real count value for the second counter 11 to a difference between the current count value and the maximum count value for the first counter 7 until there is established a condition in which the first and second counters 7 and 11 both reach the respective maximum count values substantially at the same time. In this manner, the controller 15 controls the rotational condition of the second motor 5 through the second interface circuit 17 thereby bringing the first and second motors 4 and 5 into a phase synchronized state.

The above-described control is carried out twice or more during a time period while the first counter 7 is reset once and reset again. If the first and second counters 7 and 11 are not reset substantially at the same time, the controller 15 stores a difference between the count values of the second counter 11 at the time when the first counter 7 was reset and at the time when the second counter 11 was reset as an error and then carries out an adjustment operation by adding this error to the maximum count value of the second counter 11 thereby allowing the first and second counters 7 and 11 to be reset at the same time. Preferably, it is so structured that if such an error is larger than a predetermined allowable maximum value, then the allowable maximum value is selected for use instead of the error itself thereby allowing to prevent the second driving motor 5 from being excessively loaded. Thus, in this case, the first and second motors 4 and 5 are gradually brought into phase synchronization in a stepwise manner.

As soon as the filling and capping units 1 and 2 are brought into a predetermined allowable range of synchronized condition, the controller 15 supplies a control signal to the interface circuit 16 to increase the rotational speed of the first driving motor 4 and at the same time supplies a control signal to the interface circuit 17 to increase the rotational speed of the second driving motor 5 while maintaining the synchronized condition thus attained. When the rotational speed of the first driving motor 4 has reached an intended high speed level, the controller 15 stops increasing the rotational speed of the motor 4 and serves to maintain the rotational speed of the motor 4 at the intended level. Thus, the filling and capping units 1 and 4 are now driven to operate synchronously at high speed, whereby a third mode of operation, which corresponds to a normal operating condition, is established.

During running in the third mode of operation, when a stop-operating command is supplied to the controller 15, the controller 15 enters into the second mode of operation thereby causing the first and second driving motors 4 and 5 to decrease their speeds gradually and eventually to zero. On the other hand, during running in the third mode of operation, if the synchronous relation between the filling and capping units 1 and 2 is destroyed and the predetermined allowable range of synchronized relation is exceeded, the controller 15 immediately enters into the first mode of operation.

In the case where the synchronous phase relation between the filling and capping units 1 and 2 is to be changed, for example, due to changes in the size of containers to be handled, it is only necessary to change the program or parameters stored in the controller 15 so as to take into account this phase difference. In this manner, the present synchronized driving system has an advantage of high adaptability to different operating conditions.

In the above-described embodiment, it is so structured that the synchronous relation between the filling and capping units 1 and 2 is constantly monitored from the count values even while the detection signals are inputted. However, as an alternative, simpler structure, it may be so structured to operate the capping unit 4, i.e., follower unit, at constant speed during a time period in which a correction value is calculated from a deviation of the detection signal and the next detection signal is obtained using this correction value.

While the above provides a full and complete disclosure of the preferred embodiments of the present invention, various modifications, alternate constructions and equivalents may be employed without departing from the true spirit and scope of the invention. For example, two or more follower process units to be synchronized may be provided for a single main process unit. It should also be noted that the present synchronized driving system should not be limited only to the synchronized operation between the filling and capping units but it can be applied to synchronize the operation of two or more process units of any kind. Besides, the present invention can also be applied to synchronize the operation between parts of a unit, for example, between a cutting mechanism as a main device and a feed roller for feeding a label sheet in the form of a roll as a follower device in a roll labelling machine, as well as the operation between units such as between the filling and capping units as described above. Therefore, the above description and illustration should not be construed as limiting the scope of the invention, which is defined by the appended claims.

What is claimed is:

1. A system for synchronizing the operation of at least first and second process units, comprising:
    first driving means for driving said first process unit;
    second driving means for driving said second process unit;
    first detecting means operatively coupled to said first process unit and said first driving means for supplying a first signal by detecting timing of the operation of said first process unit;
    second detecting means operatively coupled to said second process unit and said second driving means for supplying a second signal by detecting timing of operation of said second process unit; and
    control means responsive to said first and second signals for controlling the operating conditions of said first and second driving means thereby keeping said first and second process units synchronized,
    wherein each of said first and second detecting means includes a rotary encoder driven to rotate by the corresponding motor, a counter for counting the number of step pulses generated by said rotary encoder, a detector for supplying a detection signal upon detection of completion of a unit operation at the corresponding process unit, and an AND gate having its first input connected to receive a zero point pulse generated by said rotary encoder, its second input connected to receive said detection signal and its output connected to a reset terminal of said counter, whereby said counter has its output connected to said control means.

2. The system of claim 1 wherein said control means calculates a difference between said first and second signals and changes the operating condition of said second driving source thereby bringing said second process unit into a synchronized relation with said first process unit.

3. The system of claim 1 wherein each of said first and second driving sources includes a separate driving motor.

4. The system of claim 1 wherein said control means includes a micro-computer.

5. The system of claim 4 wherein said first and second process units are arranged along a predetermined path through which objects to be processed are transported.

6. The system of claim 5 wherein said objects to be processed are containers and said first and second process units are filling and capping units for filling desired contents into said containers and capping said containers thus filled with said desired contents, respectively.

* * * * *